United States Patent

Chulak

[15] 3,674,947

[45] July 4, 1972

[54] REMOTE TESTING SYSTEM FOR COMMUNICATION CIRCUITS

[72] Inventor: William Chulak, Chambly, Quebec, Canada

[73] Assignee: Northern Electric Company, Limited, Quebec, Canada

[22] Filed: May 3, 1971

[21] Appl. No.: 139,724

[52] U.S. Cl. ....................179/175.2 R

[51] Int. Cl. ....................H04m 3/22

[58] Field of Search....................179/175.2 R, 175.3

[56] References Cited

UNITED STATES PATENTS 3,571,530 3/1971 Davies ....................179/175.3

*Primary Examiner*—Kathleen H. Claffy
*Assistant Examiner*—Douglas W. Olms
*Attorney*—Philip T. Erickson

[57] ABSTRACT

A connection to a test trunk circuit and associated test circuit at an outlying central office is dialed from a test center, eliciting a short reply tone pulse as a signal to restore local circuits manually from the dialing to the testing connection. This last operation causes the local circuits to supply an answering tone which causes the remote circuits to be readied for testing until disconnected by operation of a disconnect key at the test center. In order to dispose of accidental calls by third parties to the far end test number, a timer applies a busy tone to the far end line if the answer signal does not appear within 6 seconds after the line is seized.

5 Claims, 5 Drawing Figures

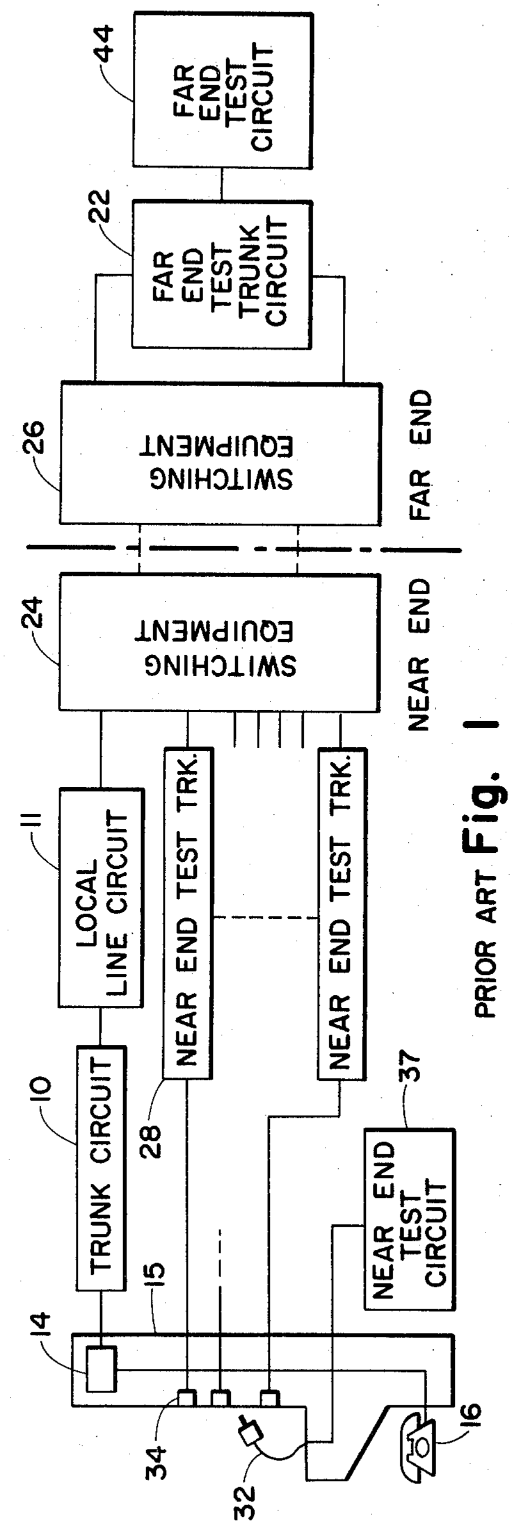
PRIOR ART Fig. 1
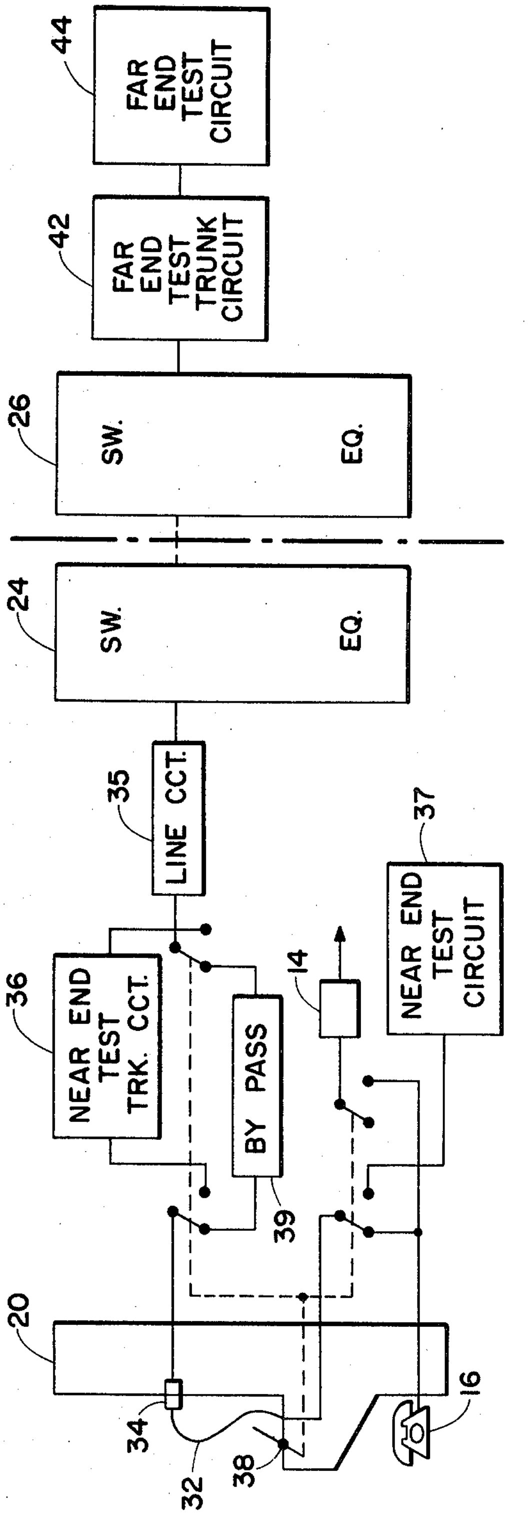
Fig. 2

REMOTE TESTING SYSTEM FOR COMMUNICATION CIRCUITS

This invention relates to the testing of local telephone subscriber lines from remote testing centers and more particularly to a system for such testing which permits subscriber lines to be tested from any of a number of centers equipped for remote testing.

In recent years, test center equipment has been provided for regular testing of subscriber telephone lines which, in addition to facilities for testing the lines of a nearby office or offices, to which permanently connected test trunks (dedicated facilities) provide access, also contain facilities for testing remote offices over voice frequency paths selected as needed from the voice frequency circuits available generally for telephone communication between the office to be tested and an office near the test center.

The procedure for testing the lines of offices remote from the test center over voice frequencies not dedicated to rest or service use has in the past utilized arrangements in which an order for a test connection is transmitted over connections which will not be utilized for the test and then an automatic dialing facility at the remote office is caused to set up a connection suitable for tests by generating a call to a test trunk circuit at the test center. That type of arrangement has a number of disadvantages. In the first place it requires the placing of two calls through the switching network connecting the two locations, in the second place it requires the use of two circuits connecting the two locations simultaneously for a short period while the test connection is being set up, thirdly it ties the testing of the particular remote location to the particular test center which the automatic dialing arrangement is programmed to call in, and finally, to simplify identification of the automatically dialled calls coming into the test center, each remote location is arranged to call a different number at the test center to set up a test, a precaution which requires a multiplicity of test trunk circuits at the test center.

It is a main feature of this invention that testing of the lines of a remote office from a test center is arranged in such a way that only one connection through the non-dedicated facilities of the switching network and of the lines connecting the two locations need be made to set up the testing connection and to utilize it until the tests are completed. This feature not only makes more economical use of the non-dedicated facilities temporarily used for the test, but they enable the elimination of the calling back facilities heretofore associated with the test trunk equipment at the remote location and the reduction of the specialized test trunks at the test center equipped for remote testing to one such circuit per testing operator. The testing operator's time is also saved because the test circuit is more rapidly established by the use of circuits and arrangements of the present invention.

In the drawings:

FIG. 1 is a block diagram of a known remote testing system;

FIG. 2 is a block diagram of a remote testing system embodying the invention;

Figure 3:
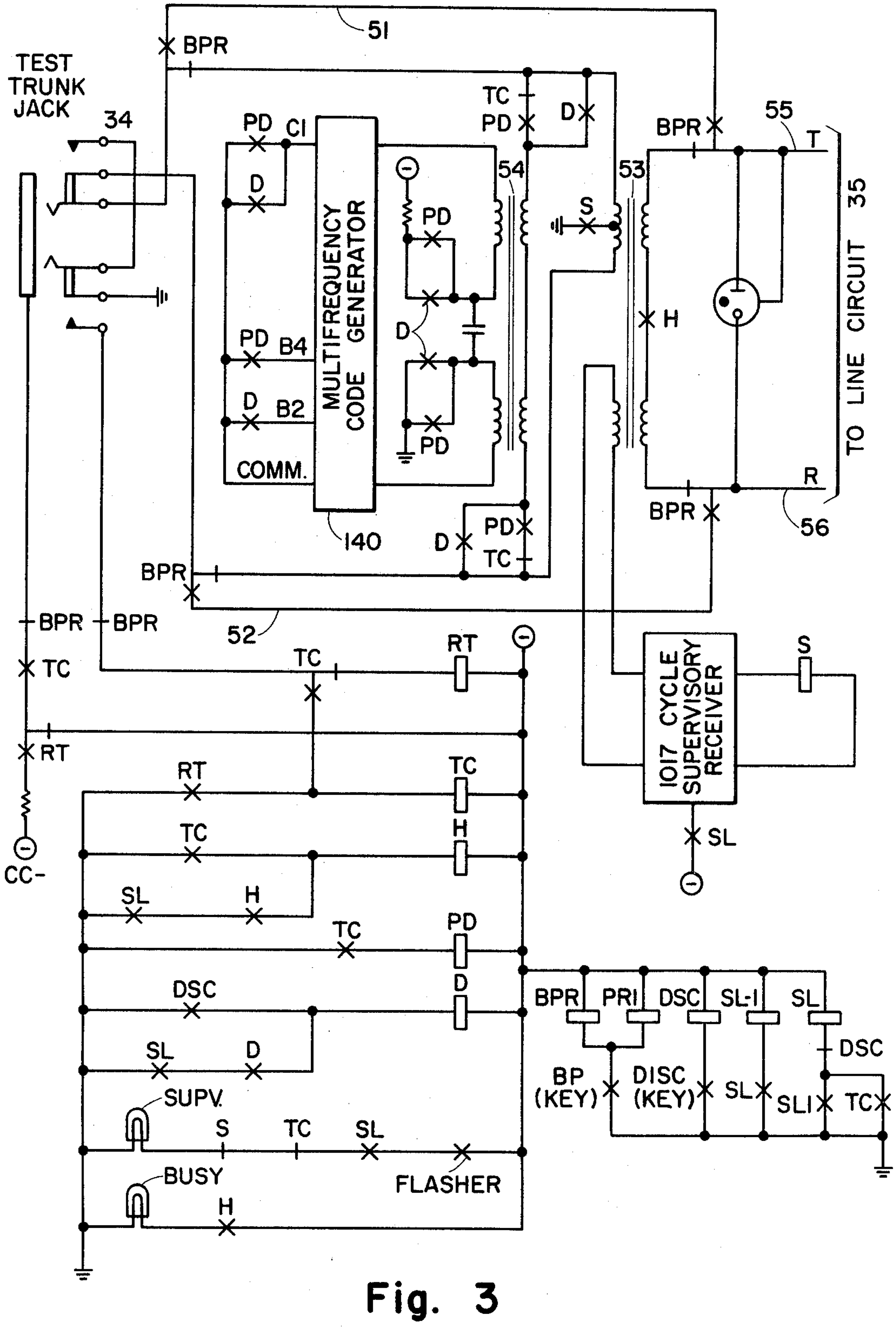
FIG. 3 is a diagram partly in block form of the near end test trunk circuit of the remote test system of FIG. 2.

FIG. 1 shows a block diagram of the type of remote testing system disclosed in C.R. Davies U.S. Pat. No. 3,410,966 issued Nov. 12, 1968. Systems of this type have gone into considerable use. Knowledge of them has been general since such a system was described in the December 1966 issue of Bell Laboratories Record. FIG. 1 differs from the first figure of the aforesaid U.S. patent in omitting the local test circuit and any specific indication of the control keys for testing and, also, in adding specific indication of the two-way trunk circuit 10 and the subscriber line circuit 11, which are used in making a call to order a remote test connection in the remote testing system of U.S. Pat. No. 3,410,966, as well as of the trunk key and lamp circuit 14, which is part of the arrangement in the test desk 15 for making various desired connections to the telephone and dial circuit available at each test position.

To test a line in a remote office with the system shown in FIG. 1, the tester operates a key in the trunk key and lamp circuit 14 of the test desk 15. This connects the telephone circuit 16 of the test desk to the local line circuit 11 via a switchboard trunk circuit 10. The tester, on receiving dial tone from the local line circuit, will dial the telephone number assigned to the far end test trunk circuit 22 through the near end switching equipment 24 and the far end switching equipment 26. The far end test trunk 22, upon being seized, will automatically dial a telephone number assigned to the near end test trunk circuit 28 through the far end and near end switching equipments 26 and 24 respectively. A lamp will be lit on the test board of the test desk. The tester will then insert the primary cord 32 into the jack 34 associated with the lamp that gave him the signal, after which he will release the key of the trunk key and lamp circuit which had previously been operated. He will then carry out the required testing of the far end subscriber's lines through the various remote testing circuits, operating keys and reading results in the same way as if he were testing local subscriber lines.

In this system, a separate telephone number at the near end is assigned to each of the remote locations that may be reached for remote testing, so that the tester will be able to verify that the call which lights the lamp on the test board comes from the location with which he has ordered a connection and is not a response to a remote test order from an adjoining position on the test board.

The above-described system which is set forth in detail in U.S. Pat. No. 3,410,966, requires the use of two trunks, one for seizing the far end test trunk circuit 22 and one for calling back the tester from the far end test trunk, until the tester releases the line first seized as described above. The trunk used for calling back the tester is subsequently used for carrying out the test.

The need for dialing the far end test trunk over a trunk separate from the one used for carrying out the test is eliminated by the present invention, in the system shown in FIG. 2. In that system the tester operates "BP" key 38, located on the shelf of the test desk to transfer certain circuits, shown as transferable by a multipole switch although in practice these transfers are effected by relays controlled by BP key 38, as explained in connection with FIG. 3. The primary cord 32 is here also placed in the jack 34, but no longer is nolonger a choice of remote testing trunks since there is now but one per testing position. The plug and jack operation could consequently, if desired, be accomplished by relays to maintain the required connections from the time the remote test is begun by operation of BP key 38 to the time it is ended by operation of the disconnect key DISC (FIG. 3). The BP key 38, when operated to initiate a remote test (a) transfers the telephone and dial circuit 16 from its connection for local operations to the conductors of the primary cord 32, (b) provides a direct path 39 from the jack 34 to the line circuit 35 by-passing near end test trunk circuit 36 and (c) disconnects the primary cord 32 from the near end test circuit 37.

Figures 4, 5:
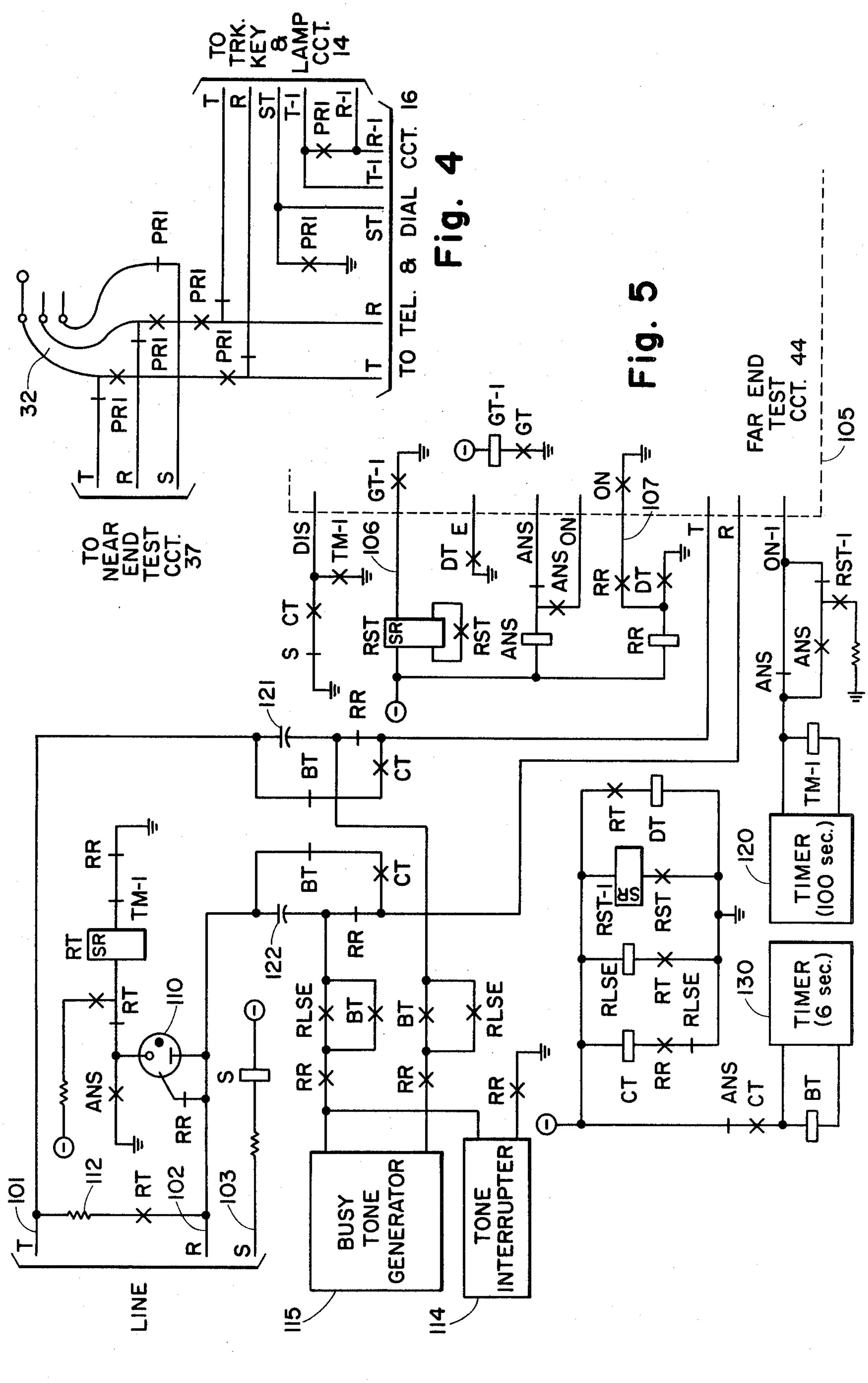
FIG. 4 is a diagram of the provisions for transfer of the primary cord circuit in the system of FIG. 2.
FIG. 5 is a circuit diagram, partly in block form, of the far end test trunk circuit of the remote testing system of FIG. 2.

Upon receiving dial tone from the line circuit 35, the tester may dial the telephone number assigned to the far end test trunk circuit 42, illustrated in detail in FIG. 4 of the drawings. On seizure, the far end test trunk circuit 42 will send back a short spurt of tone to indicate to the tester that the far end is ready to proceed with the test. The tester will then release key BP previously operated to transfer the near end test circuit 37 back to its normal connection with the primary cord 32, remove the by-pass around the near end test trunk circuit 36 and restore to telephone and dial circuits to their normal test desk connections which include association with local testing circuits.

FIG. 3 shows in detail the near end test trunk circuit 36, the by-pass 39, the jack 34, the keys BP and DISC of the test desk and their interconnections. FIG. 3 is presented so far as possible in the same format as FIG. 3 of U.S. Pat. No. 3,410,966, so that it may be unnecessary to repeat all applicable parts of the circuit description relating to that figure of the U.S. patent.

As shown at the bottom of FIG. 3 to the right of center, the BP key 38 controls two relays, BPR and PRI. The function of relay PRI is to make the necessary transfers of the circuits of the primary cord and of the test desk telephone and dial circuits. These obvious connections are shown in FIG. 4 and need not be described except to add that relay PRI when operated shunts conductors T–1 and R–1 connecting the telephone and dial circuit 16 to trunk key and lamp circuits 14 and grounds conductor ST which likewise links those two circuits. Only conductors T and R of the telephone and dial circuit are of interest in the present context.

The far end test trunk circuit 42 of FIG. 2 is shown in detail in FIG. 5. It replaces the similarly designated unit shown in FIG. 3 of U.S. Pat. No. 3,410,966. As previously mentioned, it connects to only one line of the far end switching equipment 26. This connection is at the upper left FIG. 5 and involves not only tip conductor 101 and ring conductor 102 but also, in order to provide supervision of the connection, sleeve conductor 103. At the right of FIG. 5 are the connections to the far end test circuit 44. They are identified just before they cross the dashed line boundary 105 between the far end test trunk circuit and the far end test circuit in the same way as the similar connections of U.S. Pat. No. 3,410,966 are identified in FIGS. 4 and 5 of that patent. The far end test circuit 44 is the same as the far end test circuit shown in FIG. 5 of U.S. Pat. No. 3,410,966 except for a few slight changes shown in the present FIG. 5 to the right of the dashed lines. Relay GT–1 has been added to provide additional functions to audio gate relay GT (FIGS. 8 and 17 and block 301 of FIG. 5 of U.S. Pat. No. 3,410,966). A make contact of relay GT–1 is connected to ground conductor 106 when relays GT and GT–1 operate. An additional contact on relay ON is connected to provide ground on conductor 107 when relay ON is operated (so that conductor 107 is grounded at the same time as conductor ON of the present FIG. 5). The other leads to the far end remote testing circuits, identified respectively as DIS, E, ANS, ON, T, R and ON–1 correspond exactly to those bearing the same designations in U.S. Pat. No. 3,410,966 and make the same connections in the far end remote testing circuit. The manner of operation in the far end test trunk circuit shown in FIG. 5 can now be explained.

As soon as the tester at the desk 20 (FIG. 2) has dialed the telephone number of the far end test trunk circuit, the switching equipment 24 and 26 sets up the connection and causes ringing current to be placed on the line. The ringing current fires the gas discharge tube 110 through normally closed contacts of relay RR the function of which will be described later. The breakdown of gas tube 110 will operate relay RT through normally closed contacts of relays TM–1 and RR. The operation of relay RT serves to (a) apply a low resistance shunt 112 between tip conductor 101 and ring conductor 102 in order to trip the ringing of the line in the usual manner (b) to operate relay RLSE, (c) to lock itself operated through one of its own contacts under the control of the above-mentioned normally closed contacts of relays TM–1 and RR and (d) to operate relay DT.

The operation of relay DT will apply ground on conductor E connecting to the far end test circuit 44, which as will be seen by reference to U.S. Pat. No. 3,410,966 will operate a relay identified in that patent as ON, which will in turn ground the conductor ON shown in the present FIG. 5 and also conductor 107. The operation of relay DT will also operate relay RR, which locks itself over a set of its own contacts and conductor 107, which is now grounded under control of the aforesaid relay ON (U.S. Pat. No. 3,410,966).

The operation of relay RR will (a) prepare paths for the operation of relay CT, (b) open the paths to the ignition electrode of gas tube 110 to present a false seizure, (c) apply ground to one side of tone interrupter circuit 114 in preparation for supplying tone when required (d) complete the paths prepared by operated relay RLSE to the busy tone generator 115 (e) open the paths to the connections T and R to the far end test circuit 44 to prevent tone from being applied over these leads and (f) release the relay RT.

Relay RT has a slow release characteristic. When it releases it will (a) open a shunt across conductors 101 and 102 of the line to the switching equipment 26 (FIG. 2), (b) release relay DT and (c) release the slow release relay RLSE.

During the time when both relays RR and RLSE are operated, tone is sent back to the tester. When relay RLSE releases, however, the paths for this tone is opened, so that only a short tone is transmitted, which is the signal to the tester to release BP key 38 (FIG. 2 and FIG. 3) thereby restoring the near end test trunk facilities to the circuit.

Relay CT is operated by the release of relay RLSE over the path previously prepared by the operation of relay RR. Operated relay CT restores the path from conductors 101 and 103 through to the T and R leads to the far end test circuit 44. The tester can now proceed with his test. The testing procedure is designed so that throughout the testing period signals will be sent from the test center to the remote office over a connection set up for testing as described. If these signals do not appear or if they are interrupted, timer 120, will be activated by the absence of signals. It will time out if signals do not appear within 100 seconds, then operating relay TM–1, which grounds the DIS lead to the far end test circuit 44, initiating a disconnect operation. If before timer 120 times out, a signal is received over the line, the audio gate circuits of the far end test circuit 44 will cause relay GT–1 to operate, placing a ground on lead 106 to operate slow release relay RST which in turn operates slow release relay RST–1. The latter grounds the ON–1 lead through a 464 ohm resistor, which causes timer 120 to recycle. The release time of relays RST and RST–1 in cascade assures a complete reset of the timer. The timer may be of the same type as that shown in FIG. 8 of U.S. Pat. No. 3,410,966.

One of the problems of the design of a system such as that of FIG. 2 is to make the necessary provision for dealing with the possibility that some subscriber will dial the number of the far end test trunk circuit by mistake, or that some other unauthorized call will seize the line corresponding to that number. If that happens, the same sequences of operations will be set in motion as when a tester originates the call and the calling party will hear the short start testing zone. In order to induce disconnection of unwanted calls, 6 seconds after the start tone a steady busy tone is applied to the line. The operations of the circuit here involved begin with the operation of relay CT, which happens right after relay RR operates. Relay CT starts timer 130 in operation. At the end of 6 seconds timer 130 will operate relay BT unless relay ANS has in the meanwhile operated in response to a test center answer. The relay BT when it operates will (a) open the path between line conductors 101 and 102 and the T and R leads to the far end test circuit 44 and (b) will complete the path from the busy tone generator 115 to the line conductors 101 and 102 through the blocking capacitors 121 and 122.

When the line comprising the conductors 101 and 102 is seized by the completion of a call to the corresponding telephone number through the switching network 26, ground is provided by the switching equipment 26 over the S lead corresponding to the line, in this case conductor 103, thus completing the circuit of relay S and causing it to operate. When the unauthorized calling party, hearing the busy tone, hangs up his telephone instrument, he causes a ground to be removed from the S lead, which releases the relay S. As shown in the upper right-hand portion of FIG. 5, when the relay S is released and relay CT is operated, ground is provided on the lead DIS of the far end test circuit 44, a condition which results in a disconnect operation as follows. In the far end test circuit 44, the DIS lead and the ANS lead, as shown in FIG. 5 of U.S. Pat. No. 3,410,966, initiate operations in a subcircuit shown in detail in FIGS. 13A and 13B of U.S. Pat. No. 3,410,966. By reference to U.S. Pat. No. 3,410,966, it may be seen that the disconnect operation involves the operation of a relay identified as DIS which, in operating, breaks the operating path of another relay identified as ON, the release of which breaks the continuity of the test circuit at the input transformer to which leads T and R of the far end test circuit 44 connect. This acts as a disconnect order to the switching equipment 26. The operation of the relay ON also affects a number of other relay operating paths which do not need to be described here.

When the far end test trunk circuit has been seized by a call from the test center it is necessary after the short start tone signal has been transmitted to the tester for an answer signal to be provided which will prevent timer 130 from applying busy tone. The tester's response to the start signal is to release the BP key 38. As previously noted, one of the consequences of releasing that key is to connect the near end test circuit with the primary cord and hence with the near end test trunk circuit. In addition, as shown in FIG. 3, the release of BP key 38, by releasing relay BPR restores a path to ground that allows relay RT to operate briefly and to cause relay TC to operate and lock itself. The release of relay BPR also completes a path to the sleeve contact of jack 34 over which now a short pulse of CC battery potential (somewhat exceeding twice the normal battery potential) will be applied during the short time that relay TC is operated and relay RT has not yet released. As explained in FIG. 2 of U.S. Pat. No. 3,410,966 that pulse, delivered to the near end test circuit over the sleeve conductor of the primary cord initiates a chain of relay operations which includes operating relay PC, which closes contacts 395 in FIG. 6 of the aforesaid patent and causes the multifrequency generator (FIGS. 2 and 9 of that patent) to transmit a code for a period timed by the lockout selector circuit (FIG. 7 of that patent) that will cause relay ST in the far end test circuit to operate (FIG. 5 of that patent, see also Table II thereof), leading to the completion of a path over the ANS lead, which in the present case, as in the case of U.S. Pat. No. 3,410,966 will cause operation of relay ANS in the far end test trunk circuit (present FIG. 3).

The operation of relay ANS serves (a) to lock it over its own contact and the ON lead to the far end test circuit 44, which is grounded in those circuits through a make contact of relay ON of these circuits, (b) to prepare timer 120 for resetting by relays RST and RST–1 on any testing signal (they do so at once on the answer signal), (c) to block the operation of timer 130 to prevent a false busy tone from being sent back to the tester, this being done by opening the connection between timer 130 and battery, and (d) to block any further operation of relay RT while the circuit remains seized.

With regard to the sequence of relays shown in FIG. 2 of U.S. Pat. No. 3,140,966 that leads to the operation of relay PC of that figure, there is an inconsistency between the figure and the circuit description in the text, but it is quite clear on brief consideration that it is the text which is correct (page 61, lines 14–16). Another obvious error in the drawings is in FIG. 5 of that patent where a break contact in the operating path of relay ON is identified as DI8 instead of DIS.

As mentioned before when the tester has finished his test, he operates disconnect key DISC. This operates relay DSC and relay D shown in FIG. 3. The circuits connected with multifrequency generator 140 show that operation of the D relay causes a code to be transmitted to the far end test circuit. This will cause relay DIS to operate there, initiating a disconnection in the sequence already described.

The remote testing arrangements of this invention make it possible to reach offices that are beyond the automatic dial network, since the connection in far end switching equipment 26 may be set up manually by a central office operator. Furthermore, an office equipped with the far end test trunk and far end test circuits can have its lines tested from any of a number of test centers equipped with the corresponding near end circuits. Thus, during the late hours of the night a certain number of tests may be made from a relatively few centers to a large number of offices, while day time testing may be done from more centers with less use of long distance facilities.

What is claimed is:

1. A test trunk circuit for completing, maintaining and disconnecting test connections between a distant test center and local test circuits for remote testing of subscriber communication lines comprising:

a. connection means for connecting said test trunk circuit to a set of local line circuit terminals of a central office switching system;
b. a tone signal source;
c. timing means adapted to connect said tone signal source to said connection means after a lapse of several seconds following activation of said timing means;
d. acknowledgement means adapted, in response to a ringing current received over said connection means:
   i. to trip further transmission of ringing current,
   ii. to connect said tone signal source to said connection means for a short period of the order of 1 second,
   iii. to interrupt during said short period a connection between said connecting means and said local test circuits and establish said connection at the end of said short period and
   iv. to activate said timing means;
e. holding means adapted, in response to a predetermined answer signal tone received over said connection means, to block the operation of said timing means and
f. disconnecting means adapted, in response to a predetermined disconnect signal tone, to restore the entire test trunk circuit to its idle state, said disconnecting means being further adapted to do the same also in response to a disconnection requesting condition communicated to said connection means by said central office switching system.

2. A test trunk circuit as defined in claim 1 which comprises also:

g. a second timing means and
h. reset means adapted, in response to the presence of any testing signal in said local test circuits, to supply a reset condition for at least a predetermined short period and in which:
i. said acknowledgement means is further adapted to activate said second timing means,
j. said holding means is further adapted, in response to said answer signal tone, to prepare said second timing means to be reset by the occurrence of said reset condition and
k. said second timing means is adapted to operate said disconnecting means after a predetermined period of at least half a minute following the activation of said second timing means unless during said predetermined period said reset condition occurs while said second timing means is prepared by said holding means for responding to said reset condition, said second timing means being also adapted to be freshly activated by said reset condition to start a new timing cycle when said reset condition ends.

3. A test trunk circuit as defined in claim 1 in which the first mentioned timing means is further adapted to interrupt the said connection between said connecting means and said local test circuit while said tone signal source is connected to said connection means.

4. In combination in a system for remote testing of subscriber communication lines:

a. a test trunk circuit as defined in claim 1;
b. a test position having
   i. a telephone and calling circuit,
   ii. test center remote testing circuits and
   iii. a remote testing trunk circuit connected to a set of local line terminals of a second central office switching system and adapted to transmit tone signals from said test center remote testing signals to said switching system and vice versa, and
c. switch-controlled means also at said test position for either
   i. connecting said telephone and calling circuit to said set of local line terminals over a path that bypasses facilities of said remote testing trunk circuit while disconnecting therefrom said test center remote testing circuits to enable a connection to said first-mentioned test trunk circuit to be made under control of said telephone and calling circuit, or (in another position of said switch controlled means)

ii. disconnecting said telephone and calling circuit and said path from said remote testing trunk circuit and from each other and connecting said test center remote testing circuits to said remote testing trunk circuit after said connection to said first-mentioned test trunk is made, d. whereby said local test circuits for remote testing of subscriber communication lines may be operated from test center and test results observed at said test center over the same non-dedicated communication facilities joining said central office switching systems as are used for making said connection to said first-mentioned test trunk circuit.

5. A combination as defined in claim 4 in which said switch controlled means, when actuated to disconnect said telephone and calling circuit as aforesaid, is arranged to cause transmission to said remote testing trunk circuit a predetermined answer tone signal to activate said holding means thereof.

* * * * *